United States Patent
Best et al.

(10) Patent No.: US 6,738,363 B1
(45) Date of Patent: May 18, 2004

(54) METHOD AND APPARATUS FOR SCHEDULING CALL ADMISSION CONTROL IN SATELLITE AND WIRELESS NETWORKS

(75) Inventors: Robert Eugene Best, Richardson, TX (US); Hosame Abu-Amara, Richardson, TX (US); Yi Qian, Plano, TX (US); Qingyang Hu, Plano, TX (US); Alireza Abaye, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/435,260

(22) Filed: Nov. 5, 1999

(51) Int. Cl.$^7$ ................................. H04Q 7/00
(52) U.S. Cl. .................. 370/329; 370/322; 370/347; 370/468; 455/452.2; 455/453; 455/12.1; 455/427
(58) Field of Search .............. 370/329, 321, 370/322, 347, 468; 455/450, 451, 452.1, 452.2, 453, 427, 12.1

(56) References Cited

U.S. PATENT DOCUMENTS 6,243,580 B1 * 6/2001 Garner ..................... 455/428
6,366,761 B1 * 4/2002 Montpetit ................ 455/12.1
6,549,530 B1 * 4/2003 Cable et al. ............... 370/347

* cited by examiner

Primary Examiner—Nay Maung
Assistant Examiner—Philip J. Sobutka
(74) Attorney, Agent, or Firm—Bruce Garlick; James Harrison

(57) ABSTRACT

An apparatus for allocating communication channels in a manner that increases network efficiencies or operator revenue includes a resource manager that accepts and stores (forms a queue) resource requests for a period of time. Thereafter, the resource manager allocates resources according to specified criteria. The computer instructions stored within the resource manager includes logic to prompt it to allocate communication channel resources according to the size (in order of smallest to largest) of the requested resource, or to the unit value of the requested resources. The communication channels are characterized by a time slice of a signal transmitted at a specified frequency range. Prior to allocating new non-CBR communication channel resources according to size or to unit value, the communication channels are first allocated to legacy continuous bit rate (CBR) subscribers, then to legacy non-CBR subscribers, then to new CBR subscribers.

27 Claims, 17 Drawing Sheets

New Non-CBR Requests
(In The Order Received)

| Request # | Request Code | Channels Requested | Request Revenue | Revenue /Channel |
|---|---|---|---|---|
| 1 | 870a | 10 | 75 | 7.5 |
| 2 | 872a | 4 | 5 | 1.3 |
| 3 | 874a | 8 | 50 | 6.3 |
| 4 | 876a | 14 | 42 | 3.0 |
| 5 | 878a | 4 | 12 | 3.0 |
| 6 | 880a | 2 | 12 | 6.0 |
| 7 | 882a | 5 | 28 | 5.6 |
| 8 | 884a | 6 | 40 | 6.7 |

FIG. 9

New Non-CBR Requests

Increasing Order of # Channels Requested

| Request # | Request Code | Communication Channel Requested | Request Revenue | Revenue /Channel | Number of Channels Assigned | Request Accepted | Revenue Realized |
|---|---|---|---|---|---|---|---|
| 6 | 880a | 2 | 12 | 6.0 | 2 | X | 12 |
| 2 | 872a | 4 | 5 | 1.3 | 6 | X | 5 |
| 5 | 878a | 4 | 12 | 3.0 | 10 | X | 12 |
| 7 | 882a | 5 | 28 | 5.6 | 15 | X | 28 |
| 8 | 884a | 6 | 40 | 6.7 | 21 | X | 40 |
| 3 | 874a | 8 | 50 | 6.3 | - | | |
| 1 | 870a | 10 | 75 | 7.5 | - | | |
| 4 | 876a | 14 | 42 | 3.0 | - | | |

FIG. 10

New Non-CBR Requests

Decreasing Order of Revenue per Channel

| Request # | Req. Code | Com Ch. Req. | Req. Rev. | Rev. /Ch. | Cum Chs. Used | Req. Accep. | Acceptance Criteria | Revenue Realized |
|---|---|---|---|---|---|---|---|---|
| 1 | 870a | 10 | 75 | 7.5 | 10 | X | R/C Ranking | 75 |
| 8 | 884a | 6 | 40 | 6.7 | 16 | X | R/C Ranking | 40 |
| 3 | 874a | 8 | 50 | 6.3 | 16 | | | |
| 6 | 880a | 2 | 12 | 6.0 | 18 | X | Within Non-CBR Limit | 12 |
| 7 | 882a | 5 | 28 | 5.6 | 18 | | | |
| 4 | 876a | 14 | 42 | 3.0 | 18 | | | |
| 5 | 878a | 4 | 12 | 3.0 | 18 | | | |
| 2 | 872a | 4 | 5 | 1.3 | 18 | | | |

FIG. 12

METHOD AND APPARATUS FOR SCHEDULING CALL ADMISSION CONTROL IN SATELLITE AND WIRELESS NETWORKS

BACKGROUND

1. Technical Field

The present invention relates generally to wireless communication networks, and more particularly, to controlling call scheduling in satellite and land based wireless communication networks.

2. Related Art

Wireless networks typically comprise a plurality of switching centers, base stations and mobile stations all coupled through wireline and wireless communication links to create communication channels from an originating unit to a terminating unit. Moreover, these cellular networks themselves are coupled to a plurality of wireline networks including the public switched telephone network (PSTN), the Internet, local area networks (LANs) and private branch exchanges (PBXs). The Internet itself is a plurality of data networks coupled together.

An increasing trend includes coupling each of these and other networks through gateway systems, as they are developed to allow any one device to communicate with any other device to exchange communication signals. Accordingly, the various networks are being developed to provide interface ports to create signal paths and communication links from points to other points. Thus, in the context of creating cellular networks, several issues are presented that affect how well a wireless terminal can communicate effectively with these other networks.

One issue is a basic one; namely, there is a need for data streams and, more generally, communication signals to be transported through the cellular network in a reliable manner. In addition to communication signals being transported reliably, there also exists a need to maximize communication network throughput so that a subscriber's communication signals will have the opportunity to be transported reliably, especially at times of peak usage. There is a continuous need, therefore, to maximize communication network efficiencies.

Whether the wireless communication network is a type of land based (terrestrial) network, for example North American Time Division Multiple Access (TDMA) or Global System for Mobile Communications (GSM), or a satellite based communication network, the need for maximizing the networks' efficiency and throughput exists. Along these lines, as some of these wireless networks age and become somewhat less capable in relation to newer networks having higher throughput capacity, there will be a need to extend their capacities to extend their useful lives.

The motivation to increase capacity is not limited to older communication networks. There is an ongoing need to maximize return on investment in infrastructure because communication networks are very expensive. Thus, there exists a need to maximize efficiency even in the newer, higher capacity networks. Moreover, the implementation of efficient systems reduces, in some cases, the size or amount of circuitry required to handle the communication throughput requirements.

In the context of maximizing efficiency in a wireless communication network, there exists a need to maximize the number of subscriber requests granted. To meet this need, the subscribers are ranked based on the requested number of time periods, or time slices, at a given frequency (hereinafter, "communication channels"). In current systems, resource allocation is relatively simple but inefficient. Simply described, subscribers are assigned resources on a first-come-first-served-basis if the resources are available and easily identified.

Accordingly, two basic types of inefficiencies are introduced with this approach. First, with sessions continually coming into and terminating from the network, the available pool, hereafter called the 'Resource Allocation Table' (RAT), of communication channels becomes increasingly fragmented. This will be demonstrated later. When this happens, it becomes more difficult to identify available communication channels when subscriber requests are made for multiple communication channels. The problem of how to optimally assign resources for each successive request for service can be solved using an Operations Research technique called "Integer Programming" (IP). However solving IP problems are very time consuming and are generally not solvable in real time (as required in this environment). Consequently, there will be requests that are rejected when resources may be available but not easily identified.

The second type of inefficiency in current systems comes from the fact that resource allocation decisions are being made with incomplete information. In the Operations Research discipline called 'Scheduling Theory', "online scheduling" is characterized by the first-come-first-serve approach described above. Decisions are made whether to accept a request for communication channels, and which specific channels to assign to the request, as soon the request is received without knowledge of requests which will arrive later during the predefined period.

What is needed, therefore, is a system that minimizes the problem of communication channel fragmentation and that improves allocation efficiencies.

SUMMARY OF THE INVENTION

To overcome the shortcomings of the prior systems and their operations, the present invention contemplates an apparatus and a method for allocating communication channels in a manner that increases network efficiencies and operator revenue by implementing offline scheduling. Offline scheduling is the task of assigning communication channel resources only after complete knowledge of the requests made during a predefined period of time, tp. Requests for communication channels are formed in a queue for a specified time period (tp). Thereafter, notification of communication channel assignments are returned to the requester. By utilizing a resource manager that waits until all information is available before allocating resources, communication channel allocations may be made more efficiently and, at the same time, may minimize the fragmentation problem described above.

Stated simply, a resource manager accepts and stores (forms a queue) resource requests for a brief period of time and then allocates resources according to specified criteria. The invention herein may be used in any wireless communication network including satellite-based communication networks. Accordingly, the throughput of any network may be increased thereby increasing its useful life and increasing the short and long term revenue for the given network.

After creating a queue of resource requests, the resource manager (RM) allocates communication channels in a manner that maximizes the number of requests for communication channel resources that are satisfied by giving priority in reverse order of the size of the request. In some embodiments, the RM alternately evaluates the value of connection requests, and allocates communication channels in a manner that increases revenue.

By forming a queue of resource requests before assigning communication channels, the RM is able to select a combination of communication channel assignments that improves efficiency and that increases either the number of requests that are filled or the revenue according to the objective of the network operator.

As will be detailed below, after forming a queue of resource requests for time period tp, the RM allocates communication channels in the following order:

(a) to legacy continuous bit rate (CBR) subscribers;
(b) to ongoing legacy non-CBR; and
(c) to new CBR subscribers.

This will be done in such a way as to leave a single contiguous range in the RAT for the assignment of the new non-CBR subscribers. After complementing the resource allocations as described in (a) through (c) above, the RM will then:

(d) allocate communication channels to the new non-CBR subscribers requesting communication channels in such a way as to either maximize the number of connections, the revenue to be realized from the connection requests granted or the throughput efficiency of the communication channels.

In one embodiment of the invention, communication channel resources are allocated to the new non-CBR requests according to a priority value based upon joint consideration of the revenue to be realized by accepting the connection request and the amount of requested resources. In this embodiment, a revenue ratings is assigned to each request for resources. Additionally, the number of requested communication channels is calculated. Thus, after the CBR requests and legacy non-CBR requests for signal resources are satisfied, requests are ranked by unit revenue value. A quotient of the revenue rating divided by the quantity defines the unit revenue. The unit revenue is used for determining priority.

This problem is recognized in Operations Research as a computationally complex problem called the 'Knapsack Problem' where the task is to select the combination of connections that maximize the sum of the revenues represented by the accepted connections without violating the limit represented by the number of available communication channels in the RAT. A heuristic algorithm is used to determine a near optimal solution to this Knapsack Problem in linear time, thereby making it practical to use in making real time resource allocation decisions.

In another embodiment of the invention, communication channel resources are allocated according to a priority value based only upon the amount of requested resources. In this embodiment, the number of requested communication channels is calculated. Thus, after the CBR requests and legacy non-CBR requests for signal resources are satisfied, new non-CBR requests are assigned based on the signal resources requested.

This problem is recognized in Operations Research literature, as a "Job-Shop Scheduling Problem" with the objective of minimizing the number of 'tardy jobs'. This involves only the need to rank the requests in increasing order of the quantity of resources that are requested in real time. In yet another embodiment, the requests are ranked in order of decreasing request size in view of remaining resources to maximize throughput efficiency.

Other aspects of the present invention will become apparent with further reference to the drawings and specification that follow.

BRIEF DESCRIPTION OF THE DRAWINGS

A better understanding of the present invention can be obtained when the following detailed description of the preferred embodiment is considered with the following drawings, in which:

FIG. 9 is a table illustrating data and preliminary analysis done by the RM before scheduling new non-CBR subscribers;

FIG. 10 is a table illustrating the specific analysis done by the RM before assigning channels to new non-CBR subscribers for the preferred embodiment of the invention;

FIG. 12 is a table illustrating the specific analysis done by the RM before assigning new non-CBR subscribers for a second preferred embodiment of the invention.

DETAILED DESCRIPTION OF THE DRAWINGS

Figure 1:
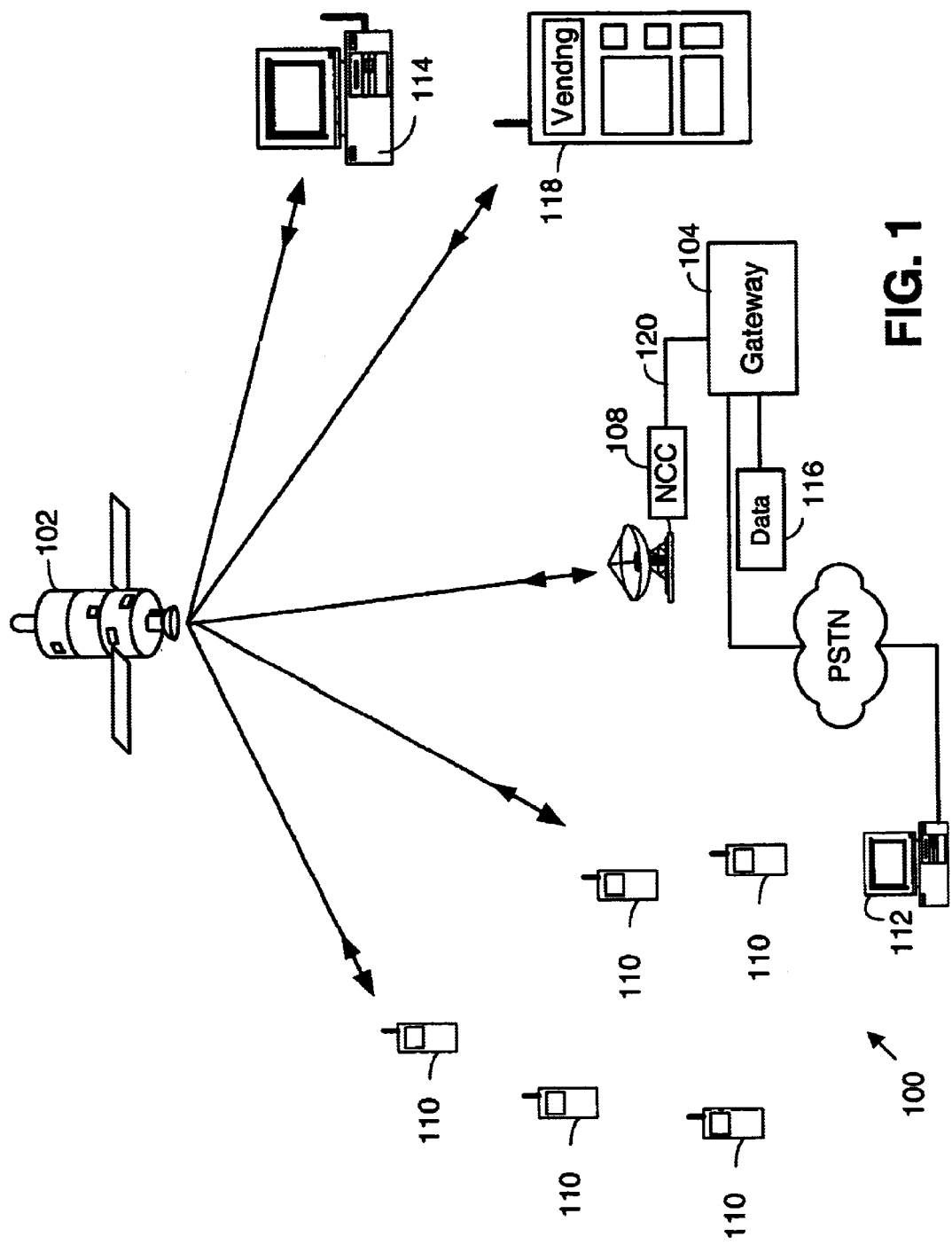
FIG. 1 is a functional block diagram of a satellite based communication network according to a described embodiment of the invention.

FIG. 1 is a functional block diagram of a satellite communication network according to an embodiment of the invention. For simplicity, it is assumed that the satellite communication network is geosynchronous earth orbit (GEO) based such that a single satellite provides coverage over a wide geographic area. However, in another embodiment, the satellite communication network may be a low earth orbit (LEO) system or a medium earth orbit (MEO) system in which a plurality of satellites service a wide geographic area and in which each satellite has a time varying coverage area.

The satellite communication system 100 includes a satellite 102 that communicates with a gateway 104 by way of a network control center (NCC) 108. Pluralities of mobile terminals 110, operating within range of the satellite 102, also communicate with the satellite 102. The components in combination therefore route communications between the gateway 104 and the plurality of mobile terminals 110. In operation, the satellite 102 serves to relay these communications. In another embodiment the satellite may communicate directly with the gateway, with the NCC serving various roles including the role of notifying (via the RAT) the satellite, the gateways, and all terminals of the assignment of communication channel resources.

The satellite 102 includes at least one antenna that supports multiple beams for communications with Earth located devices. Narrow spot beams having a relatively higher power density are typically used for communications between the mobile terminals 110 and the satellite 102. Broader beams having relatively lower power densities are typically used for communications between the satellite 102 and the gateway 104. For example, when gateway 104 communicates with mobile terminal 110, the link between the satellite 102 and the mobile terminal 110 is supported by a narrow beam and the link between the gateway 104 and the satellite 102 is supported by a broader beam.

By directing the narrow spot beams, the satellite 102 may segregate service areas within a large geographic area served by the satellite 102 into smaller service areas. Each service area typically includes a single country or a large portion of a country. Each gateway 104 serves a respective service area and couples to the public switched telephone network (PSTN) at a respective connecting location. Calls between a mobile terminal 110 and a destination device 112 coupled to the PSTN are routed from the mobile terminal 110 via the satellite 102 to a serving gateway 104 and then via the PSTN to a destination device. By way of example, external device 112 is shown in FIG. 1 transmitting a data signal 116 to gateway device 104 by way of the PSTN.

In traditional satellite systems, a network control center (NCC) 108 processes call setup in addition to other network controlling functions for a group of communicating subscriber units including mobile terminals 110 as well as other subscriber units. These other subscriber units (e.g., subscriber units 114 and 118) may use the satellite system 100 for fixed location data service, fixed location voice service, for backup communication service, for non-peak status reporting, as a preferred routing path for its communications or for other communication needs.

The centralized call setup functions provided by the NCC 108 extend to gateway 104 within the satellite communication system 100. For example, should mobile terminal 110 desire to call subscriber unit 114 or 118, the NCC 108 sets up the call to provide a routing path from the mobile terminal 110 to the subscriber unit 114 or 118. In the example herein, subscriber unit 114 comprises a wireless data terminal or computing device capable of engaging in wireless communications with satellite based transceivers. Subscriber unit 118 comprises a vending machine formed to communicate with gateway 104 through NCC 108 by way of satellite 102.

In setting up a call, NCC 108 is operable to receive call setup requests from any number of subscriber units that are currently operating in the service area of gateway 104. By way of example, each of the mobile terminals 110, the vending machine 118 and the data terminal 114 (subscriber units) make a resource request within a specified period for one or more communication channels. Responsive to the resource requests, NCC 108 evaluates available resources and responds with communication channel assignments.

To transmit the allocation assignments, NCC 108 communicates with the subscriber units via the satellite 102, directing a narrow beam communication to the subscriber units. The narrow beam communication directs the subscriber units to communicate with gateway 104 via the satellite on the specified signal channels. Subsequently, the NCC 108 communicates with gateway 104 via communication path 120 to direct it to communicate with the mobile terminal 110 over specified signal channels. Once the NCC 108 has completed the call setup, the call is established.

Continuing to refer to FIG. 1, NCC 108 determines how to allocate communication channels in a manner that increases throughput and revenue. As will be described in detail below, NCC 108 allocates communication channels according to several factors. In one preferred embodiment, allocations are made to maximize the number of connections. By way of example, NCC 108 evaluates the quantity of communication channels that will be required to transport data signal 116 prior to allocating resources to allow external device 112 to transport the data signals 116 over the satellite network 100. To maximize the number of connections, the NCC 108 ranks the connection requests in increasing order based upon the number of communication channels requested. The subscriber connections are granted based on the fewest number of communication channels requested being granted connection first.

In another preferred embodiment, allocations are made to maximize revenue. In this embodiment, the NCC 108 examines a combination of the requested resource size and the revenue represented by the subscriber request to determine a ranking designed to increase revenue. Stated differently, NCC 108 not only examines the revenue that the requested connection represents to the networks, but also the quantity being requested. The quotient of the connection revenue divided by the quantity (i.e. 'unit revenue' or revenue per communication channel) is used to determine the priorities of the requesting subscribers.

In other embodiments of FIG. 1, signals between NCC 108 and gateway 104 may be carried over the satellite instead of the ground. Gateway 104 may be connected to a variety of other networks, such as the Internet, private enterprise networks, wireless networks, ATM networks, Frame Relay networks, and other satellite networks. Hence, external device 112 and gateway 104 may communicate with each other via networks other than PSTN. Once NCC 108 allocates communication channels, gateway 104 and subscriber units such as 110, 114, and 118 may communicate directly with each other via satellite 102 or through NCC 108.

Figure 2:
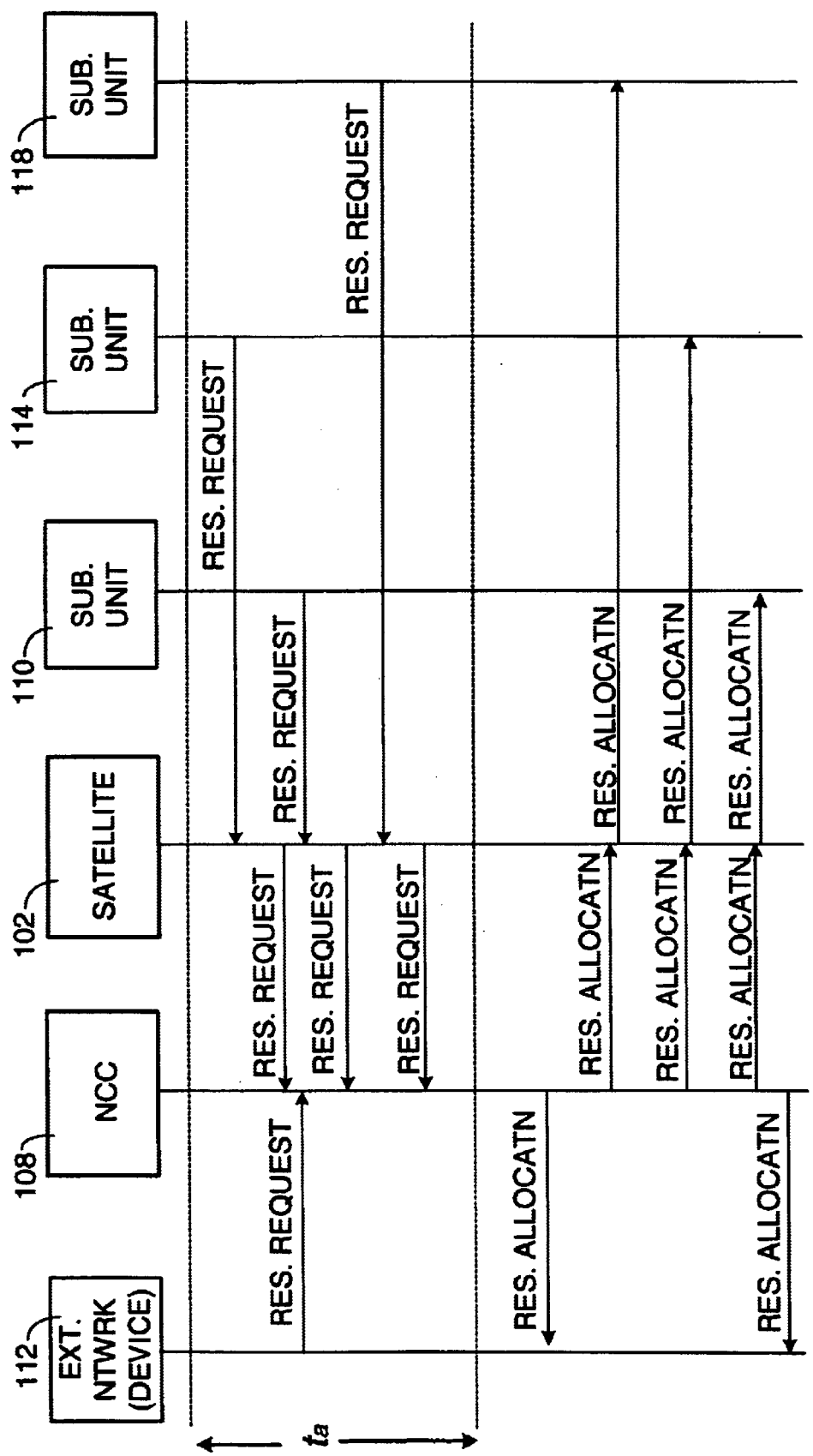
FIG. 2 is a message flow diagram that illustrates the system operation of an embodiment of the invention in which a satellite based communication network communicates with a plurality of subscriber units.

FIG. 2 is a message flow diagram that illustrates the system operation of an embodiment of the invention in which a satellite based communication network communicates with a plurality of subscriber units. Referring now to FIG. 2, a satellite based communication network includes an external device 112 coupled to communicate with NCC 108. NCC 108 is coupled to communicate with subscriber units (one mobile terminal 110, a data terminal 114 and a vending machine 118) via satellite 102.

In operation, mobile terminal 110, data terminal 114 and vending machine 118 each transmit a resource request at different times but within a specified time period $t_a$ to satellite 102. Upon receiving each resource request, satellite 102 transmits the resource request to NCC 108. NCC 108 stores all of the received resource requests to form a resource request queue. The queue of resource requests includes all of the resource requests received within a specified period $t_a$. As may be seen, a resource request was also received from an external device 112 during the specified period $t_a$.

Once $t_a$ has expired, the resource manager, here it is NCC 108, determines how to allocate communication channels according to one of several different methods described in detail below. After determining how communication channels are to be allocated, NCC 108 transmits through the signaling channel, the communication channel allocation information to each of the subscriber units and the external device 112 having previously made a resource request. As may be seen, NCC transmits the communication channel allocation information through a gateway to external device 112 and to the subscriber units by way of satellite 102.

Figure 3:
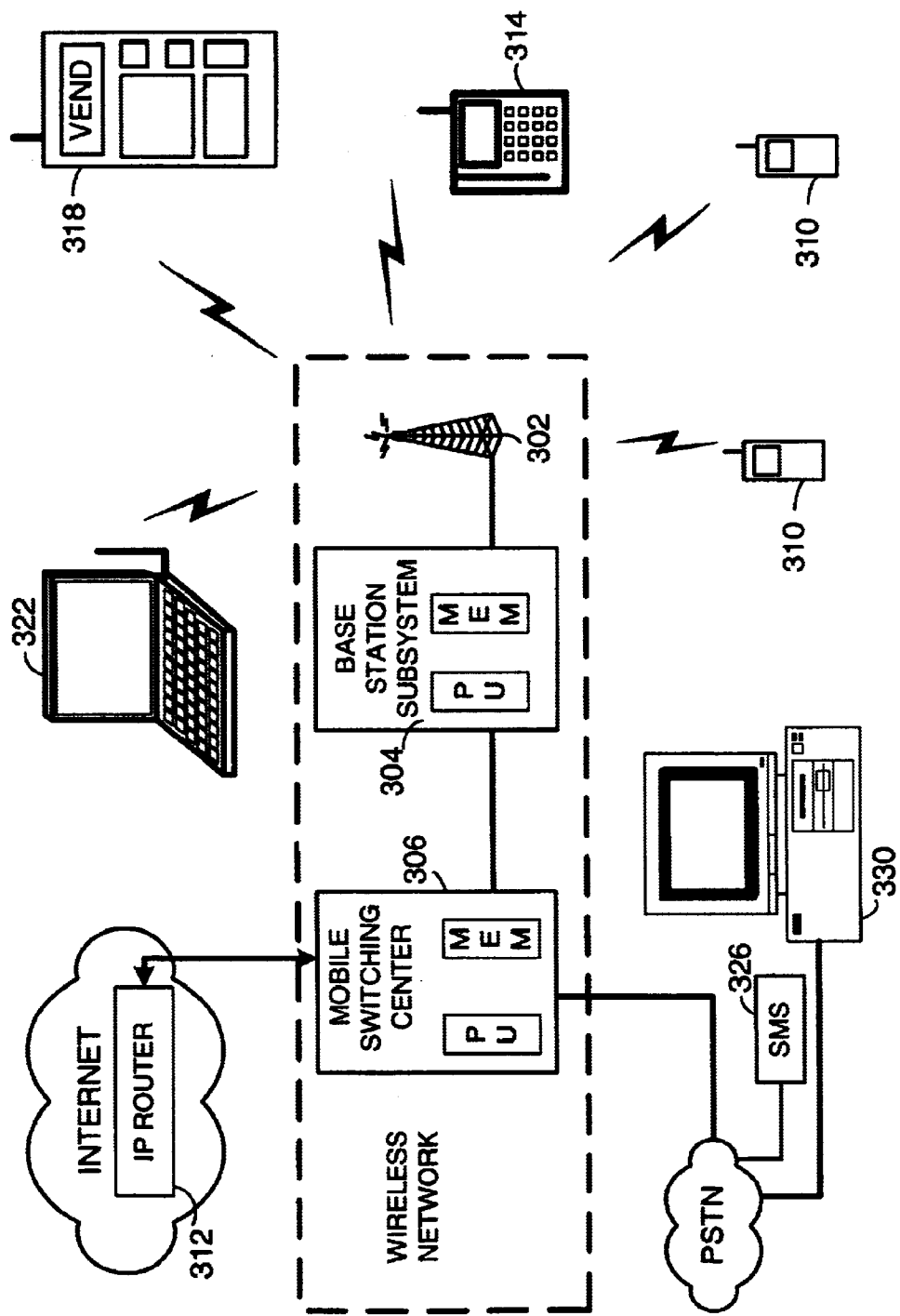
FIG. 3 is a functional block diagram of a land based wireless communication network according to a described embodiment of the invention.

FIG. 3 is a functional block diagram of a land based wireless communication network according to a described embodiment of the invention. Referring now to FIG. 3, the wireless network includes a tower 302 for transmitting and receiving wireless communication signals, a base station subsystem (BSS) 304 coupled to tower 302 and to a mobile switching center (MSC) 306. BSS 304 is for controlling and transceiving communication signals with wireless radio transceivers through tower 302 and for relaying communication signals to and from the cellular network and other networks through MSC 306.

The cellular network 300 communicates with a plurality of mobile stations 310, a fixed wireless data terminal 314, a remote communication device 318 and a computer terminal unit 322. BSS 304 of cellular network 300 includes a processing unit and memory (random access memory as well as storage devices) that enable it to store protocol information and logic for communicating with any type of device capable of transceiving communication signals utilizing a time-division multiple access-based protocol, such as IS-136 or GSM. MSC 306 also includes a processing unit and memory to support communications with the same devices as well as with the BSS 304 to which it is coupled, other MSCs 306 (not shown), the public switched telephone network (PSTN) and the Internet by way of an IP router 312. Either MSC 306 or BSS 304 or both include in their memories the logic (in the form of software instructions) that, when executed causes the cellular network 300 to allocate communication channels to increase efficiency, throughput and revenue as is described below. Thus, the processors of MSC 306 or BSS 304 communicate with the memory to execute the computer instructions stored within.

The types of devices shown in FIG. 3 that communicate with the cellular network 300 can vary greatly. By way of example, remote communication device 318 comprises, in the described embodiment, a vending machine that communicates through the cellular network and then the PSTN to reach a credit card processing center to obtain approval for a credit card purchase. Additionally, the fixed wireless terminal 314 and the computer terminal unit 322 generate voice or data for transmission through the wireless network 300. MSC 306 and BSS 304 further support short message service (SMS) messages 326 originated by an SMS server 330. The SMS protocols and signal formats also are stored within memory of MSC 306 and SS 304.

The wireless network 300 includes wireless terminals that transmit and receive data of many different types and at different rates. While the throughput requirements of mobile stations 310 are relatively low because they typically only transmit voice and low speed data (e.g. SMS), the computer terminal unit 322 may, in some instances or configurations, have a need for quickly transporting large amounts of data in a short period of time. Accordingly, the instantaneous throughput requirements of computer terminal 322 can be relatively large in comparison to mobile station 310. As may be seen in FIG. 3, MSC 306 also is coupled to receive user traffic from an IP router. The user traffic from IP router 312 can also have either occasional or frequent requirements for high data throughput. By way of example, IP router 312 may desire (i.e., its internal programming steps are prompting it to attempt to perform a specified function) to route video to computer terminal 322 through wireless network 300. For the received video to be acceptable, the network of FIG. 3 must transport the video in large quantities at a fast rate. On the other hand, vending machine 318 may only need to transport messages containing various operational parameters on a low priority basis. Accordingly, communication channel assignments for it may vary according to system capacity. As may be seen, therefore, the system of FIG. 3 demonstrates that different types of subscriber units have different priority and instantaneous throughput requirements.

The memory of the BSS 304 (or MSC 306 according to implementation), include computer instructions to be performed by the internal processing unit of BSS 304 (or MSC 306) to allocate communication channels according to priority ratings given to the resource requests made by the various subscriber units. The actual logic defined by the computer instructions is defined in the signal flow diagrams and flow charts contained herein. Alternatively, the computer instructions to allocate communication channels may be stored in a stand-alone unit separate from BSS 304 and MSC 306.

Figure 4:
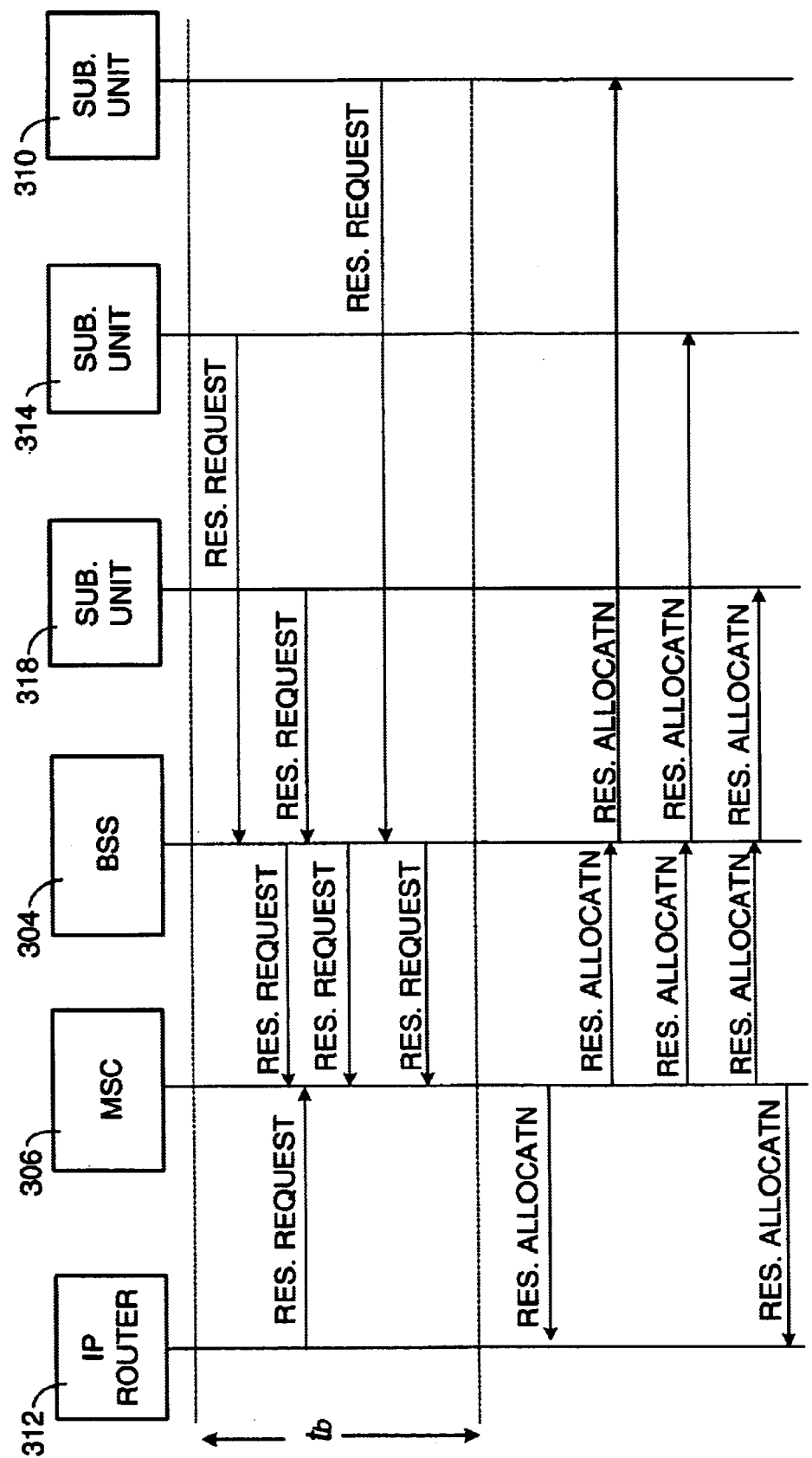
FIG. 4 is a message flow diagram that illustrates the system operation of an embodiment of the invention in which a land based communication network communicates with a plurality of subscriber units.

FIG. 4 is a signal flow diagram that illustrates the system operation of an embodiment of the invention in which a land-based wireless communication network communicates with a plurality of transceivers. Referring now to FIG. 4, an MSC 306 of a wireless communication network is coupled to an IP router 312 and to a BSS 304. BSS 304 communicates via a wireless communication link with a plurality of subscriber units. By way of example, MSC 306 communicates with a mobile station 310, a data terminal 314 and a vending machine 318 via BSS 304.

In operation, mobile station 310, data terminal 314 and vending machine 318 each transmit a resource request at different times but within a specified time period $t_b$ to BSS 304. Upon receiving each resource request, BSS 304 transmits the resource request to MSC 306. MSC 306 stores all of the received resource requests to form a resource request queue. The queue of resource requests includes all of the resource requests received within a specified period $t_b$. As may be seen, a resource request was also received from an IP router 312 during the specified time period $t_b$.

Once $t_b$ has expired, the resource manager, here it is MSC 306, determines how to allocate communication channels according to one of several different methods described in detail below. After determining how communication channels are to be allocated, MSC 306 transmits the communication channel allocation information to each of the subscriber units and the IP router 312 having previously made a resource request. As may be seen, the MSC transmits the communication channel allocation information through the signaling channels to external device 312 Internet IP routers, and to the subscriber units by way of BSS 304.

Figure 5:
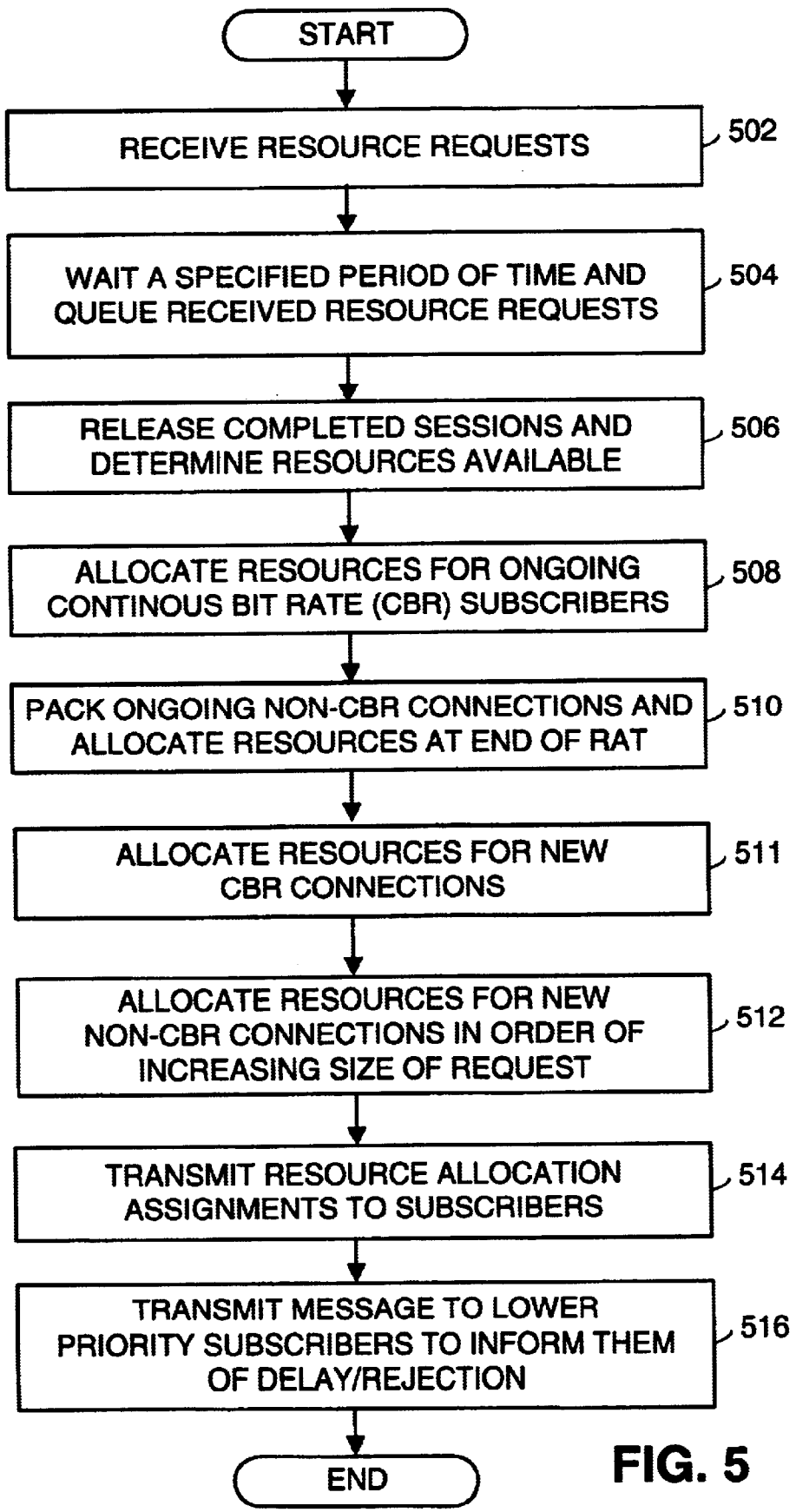
FIG. 5 is a flow chart illustrating a first preferred method of the invention in which a resource manager allocates resources to maximize the number of connections.

FIG. 5 is a flow chart illustrating a first preferred method of the invention in which a resource manager such as an MSC or an NCC allocates resources to maximize the number of connections. Referring now to FIG. 5, the resource manager (RM) receives resource requests from any one of many different types of wireless transceivers and other communication devices wanting to be allocated communication channels to transmit voice, video or other communication signals over a wireless communication link (step 502). The RM creates a list or queue of resource requests received during a specified period (step 504).

In practice, the specified period that is used to form the queue depends, at least in part, upon the amount of traffic that the RM controls in a given period. Typically, wireless and satellite networks utilize frames for collectively transmitting a large number of signals over the air interface. A frame is an integer multiple of communication channel time slices or periods. The given period used to form a queue of resource requests is usually set to be the same as the period of one frame.

While building the queue of resource requests, the RM also releases resources for completed communications and makes a determination as to what resources or communication channels will be available for the next transmission period (step 506). Once the specified period is over (e.g., $t_a$ of FIG. 2 or $t_b$ of FIG. 4) and RM has determined what resources are available, the RM allocates the communication channels as follows.

First, legacy (ongoing) CBR subscribers are allocated the same communication channels currently granted (step 508). Second, the legacy non-CBR subscribers are compacted into contiguous communication channel slots and are positioned at the end of the communication channel allocation table (step 510). Third, new CBR requests are packed into the allocation table in between the legacy CBR subscribers and the legacy non-CBR subscribers (step 511). The new CBR requests are packed in a manner so as to not violate any subscriber unit constraints, e.g. so as to not assign any new CBR subscriber to communication channels which include two distinct frequency slots with the same time slot in different frequency bands. In the preferred embodiment, the new CBR requests are packet as close as possible to the legacy CBR subscriber channels.

Fourth, this leaves a large pool of contiguous RAT slots for assigning to new non-CBR connections. While the legacy connections are given the highest priority, it does not follow that the legacy connections create the most revenue for the service provider. For example, a subscriber that pays even the lowest communication channel fare or unit value would be able to maintain its connection even if demand exceeds capacity and other subscribers seeking communication channels are willing to pay a higher unit rate. The reason for such a situation may be that the connection was established during a period in which capacity exceeded demand. Such legacy connections are given highest priority to avoid creating transmission problems for subscribers by dropping their connections.

Once communication channels have been allocated to the legacy connections and the new CBR connections, the RM must then determine how to allocate the remaining communication channel resources. In the described embodiment, the RM allocates communication channels according to the amount of resources requested (step 512). For example, a non-CBR request for five communication channels will be given priority over a non-CBR request for any number of channels more than five. In the event that there are multiple requests for the same amount of resources, priority is given in order the requests were received.

One advantage of allocating communication channel resources according to the size of the request is that such a scheme tends to create an allocation of communication channels assignments connects the largest number of subscribers requesting service. For example, suppose five communication channels are available and there are four pending subscriber resource requests, one for one unit and one for four units, and two separate requests for two units. If the request for four communication channels is accepted first, then the most connections which can be made is two (by accepting also the request for one unit—for a total of five units). However, if the requests are made based on the highest priority for the request with the least size of resources requested, there would be three connections established (one unit (connection 1), two units (connection 2), and two units (connection 3)—a total of five units. One benefit of such a system is that the number of requests that are not immediately filled is reduced.

After determining how to allocate communication channel resources, the RM transmits resource allocation assignments to the subscribers requesting resources (step 514). All resource allocation determinations are made prior to transmitting the resource allocation assignments. Finally, if the instantaneous demand exceeds the instantaneous throughput capacity, the RM transmits messages to the lower priority subscribers to inform them of the request rejection for their allocation assignments (step 516).

Figure 6:
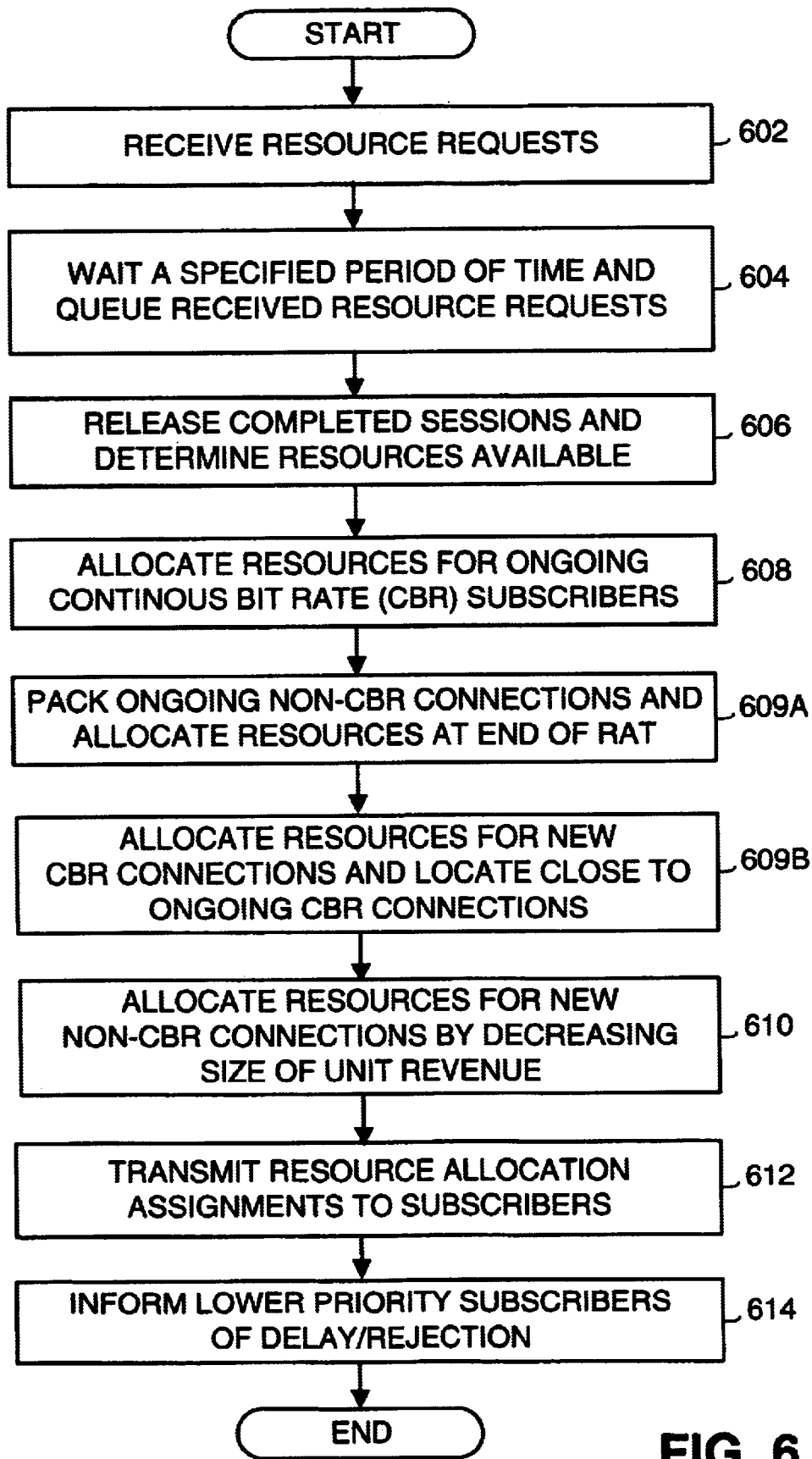
FIG. 6 is a flow chart illustrating a second preferred method of the invention in which a resource manager allocates resources to increase revenue.

FIG. 6 is a flow chart illustrating a second preferred method of the invention in which a resource manager such as an MSC or an NCC allocates resources to increase revenue. Referring now to FIG. 6, the resource manager (RM) receives resource requests from any one of many different types of wireless transceivers and other communication devices wanting to be allocated communication channels to transmit voice, video or other communication signals over a wireless communication link (step 602). The RM creates a list or queue of resource requests received during a specified period (step 604).

In practice, the specified period that is used to form he queue depends upon the amount of traffic that the RM controls in a given period. As described above, a typical period used to form the queue of resource requests is usually set be the same as the duration or period of one frame.

While building the queue of resource requests, the RM also releases completed communications and makes a determination as to what resources or communication channels will be available for the next transmission period (step 606). Once the specified period is over and RM has determined what resources are available, the RM allocates communication channels as follows:

First, legacy CBR subscribers are allocated the same communication channels currently granted (step 608). Second, the legacy non-CBR subscribers are compacted into contiguous communication channel slots, and are positioned at the end of the communication channel allocation table (step 609A). Third, the new CBR requests are packed into the allocation table in the same general location of the legacy CBR subscribers in the area between the legacy CBR and non-CBR connections (step 609B). The new CBR requests are packed in a manner so as to not violate any subscriber unit constraints, e.g. not to assign any new CBR subscriber to communication channels which include two distinct frequency slots with the same time slot in different frequency bands. Fourth, the remaining RAT slots may be assigned to new non-CBR connections as is described below (step 610).

Once communication channels have been allocated for CBR and legacy non-CBR channel requests, the RM allocates communication channels for the new non-CBR requests according to the unit revenue value of the requests. In the preferred embodiment, the 'unit revenue' is a quotient of the total revenue value of the request divided by the number of communication channels requested. The requests are ranked in order of decreasing calculated unit revenues.

After determining how to allocate communication channel resources, the RM transmits resource allocation assignments through the signaling channels to the subscribers requesting resources (step 612). All resource allocation determinations are made prior to transmitting the resource allocation assignments.

Finally, if the instantaneous demand exceeds the instantaneous throughput capacity, the RM transmits messages to the lower priority subscribers to inform them of the request rejection for their allocation assignments (step 614).

Figure 7A:
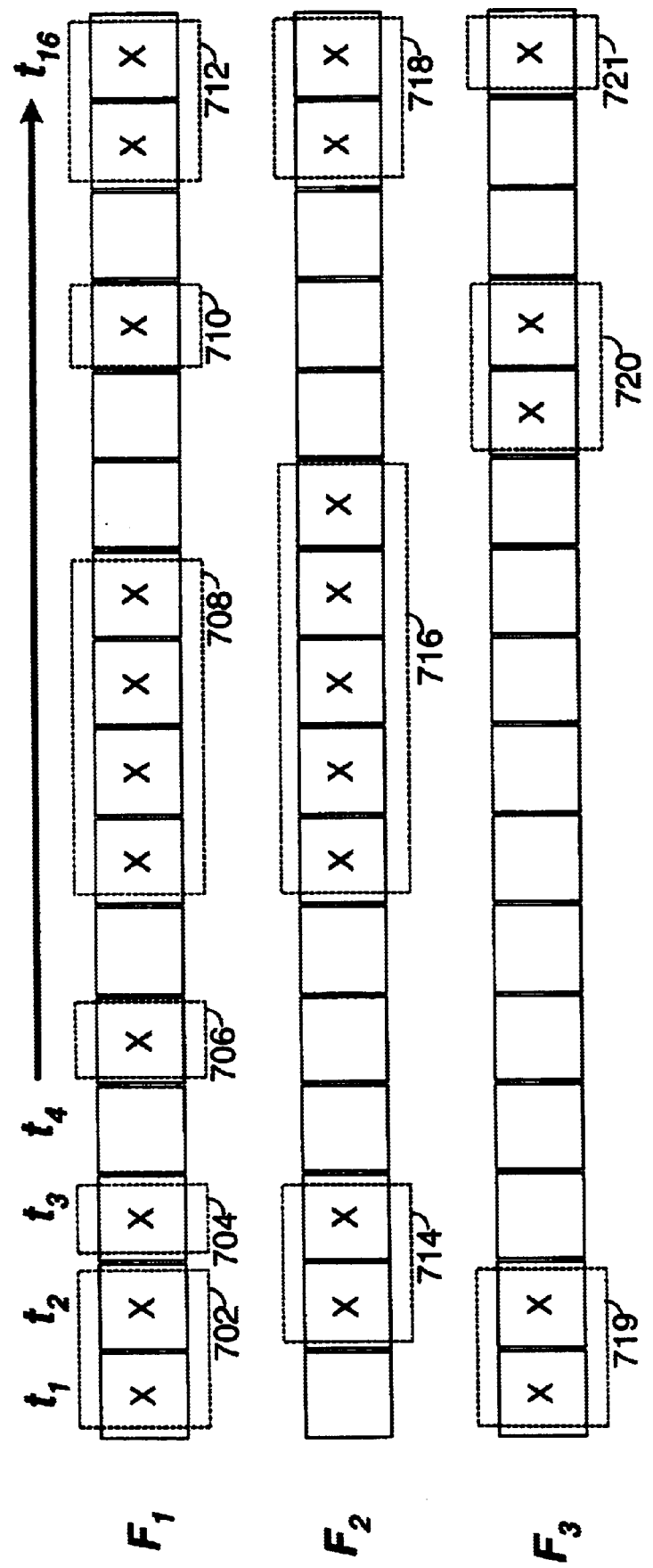
FIGS. 7A–7C are functional block diagrams illustrating resource allocation in a prior art system.
Figure 7B:
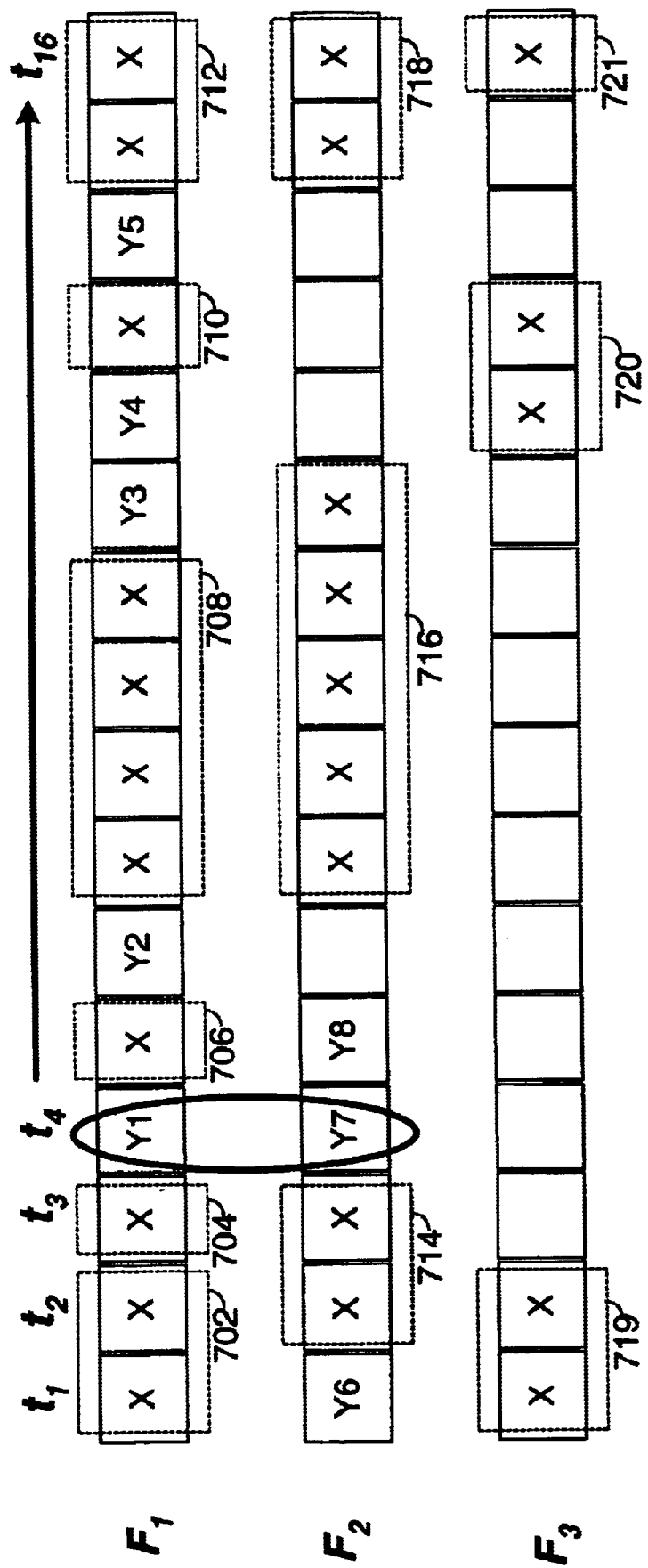
Figure 7C:
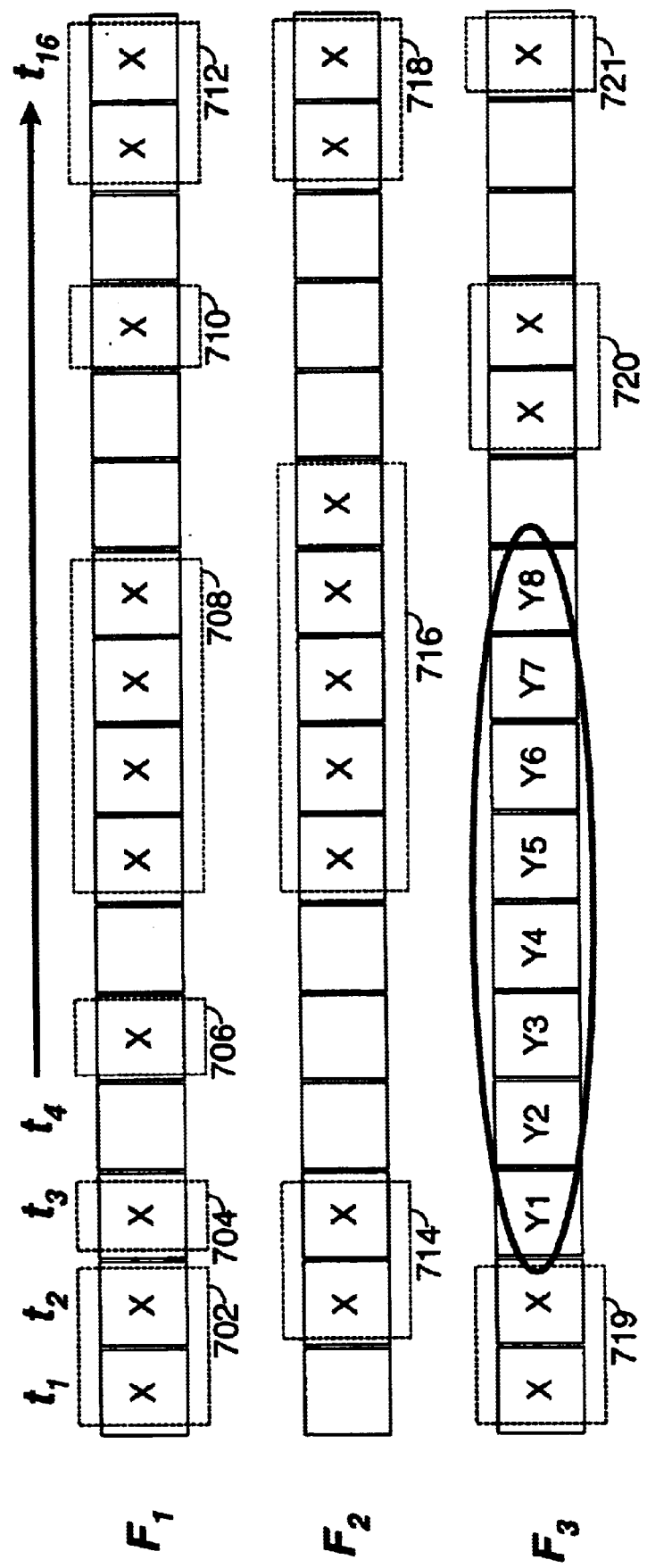

FIGS. 7A–7C are functional block diagrams that illustrate communication channel resource allocation in a prior art system of a set of transmissions, each at a different frequency. As may be seen, three data streams are transmitted, one at a frequency F1, one at frequency F2 and one at a frequency F3. Each data stream is divided into a plurality of periods for transmitting communication channels. Thus, a frequency and a time slice jointly characterize each communication channel.

By way of example, in FIG. 7A, the channels marked with an X illustrate legacy connections in place when the RM must allocate addresses to honor new channel requests. For the legacy connections in prior art networks, all subscribers retain the communication channel addresses originally assigned. In this example, a first subscriber is allocated the two communication channels shown at 702. A second subscriber is allocated one communication channel 704 immediately after the two channels shown at 702. A communication channel 706 is allocated to a subscriber, but it is separated from the communication channels 704 by an unallocated communication channel. Similarly, the communication channel immediately after channel 706 is not allocated to any user. Thereafter, four communication channels 708 are allocated, two are not allocated, one channel 710 is allocated, one is not and finally two channels 712 are allocated.

Similarly, the communication channels that are transmitted at the frequency F2 include the second and third channels 714 being allocated, the next three channels not being allocated, the next five channels 716 being allocated, the next three not being allocated, and finally, the two channels 718 being allocated.

The communication channels that are transmitted at frequency F3 include the first and second channels 719. The next nine channels are not allocated, the next two channels 720 are allocated, the next two channels are unallocated, and finally the last channel 721 of frequency F3 is allocated.

Referring now to FIG. 7B, the new subscriber Y is requesting eight communication channels. The RM is not required to allocate contiguous channels to new subscribers. However, there is a constraint called the "Multiple Frequency Constraint" (MFC) rule that does not allow a subscriber to be assigned the same time slot in two different frequencies. In other words, the RM assigning time slot t4 to a subscriber in frequency F1, can not assign time slot t4 to that same subscriber in frequency F2 as illustrated by the circled channels carrying Y1 and Y7.

The series of Y1 through Y8 for the subscriber Y, as shown in FIG. 7B, demonstrate one allocation that seems to alleviate much of the fragmentation problem described before. The problem with this allocation, as depicted in the encircled cells, is that the MFC is violated because Y1 and Y7 are assignments for the same subscriber Y. In the example, Y1 and Y7 have the same time slot assignment (t4) in different frequency bands (F1 and F2). If the decision is made to shift Y7 and Y8 to the right, then Y2 and Y8 will have the same time slot and again violate the multiple frequency constraint. A simpler assignment for the RM is represented in FIG. 7C. In this assignment, contiguous cells in frequency F3 represented by Y1 through Y8 are assigned. This is a valid assignment, but leaves the RAT very fragmented as demonstrated by all of the unassigned cells.

One purpose of the example illustrated in FIGS. 7A–7C is to demonstrate the complexity faced by the RM in making allocations, and the waste of resources that can occur whenever communication channels are allocated using the prior art.

Figure 8A:
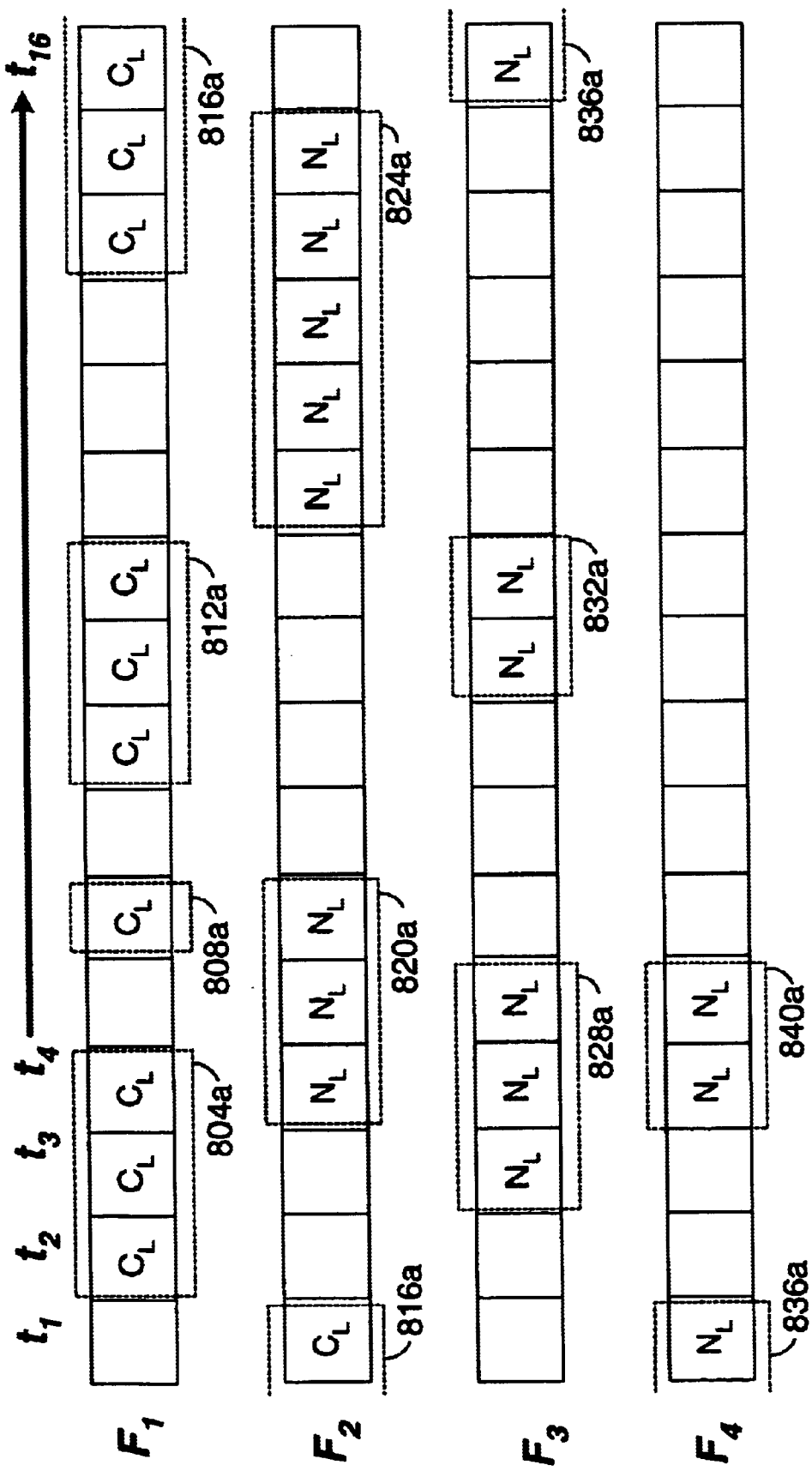
FIGS. 8A–8C are functional block diagrams illustrating the basic partitioning of the RAT into four ranges for carrying on-going CBR, new CBR and on-going non-CBR that is compacted and positioned at the end of the RAT.

FIGS. 8A–8C and 9–13 are functional block diagrams illustrating the general assignment methodology for various embodiments of the current invention. FIG. 8A is an example of a functional block diagram illustrating the status of the resource allocation table (RAT) after new service requests have been stored in queue (see step 504 in FIG. 5 and step 604 in FIG. 6), and resources for completed sessions have been released (see step 506 in FIG. 5 and step 606 in FIG. 6). $C_L$ (Legacy (ongoing) CBR connections), and $N_L$ (Legacy (ongoing) Non-CBR connections) represent connections which are currently active, which must carry into the next RAT. The example assumes that the RM has queued two new requests for CBR service ($C_N$). Subscriber 850a is requesting 10 communication channels, while subscriber 860a is requesting 5 communication channels. In addition, eight new requests have been identified for Non-CBR service ($N_N$) as demonstrated in FIG. 9.

Figure 8B:
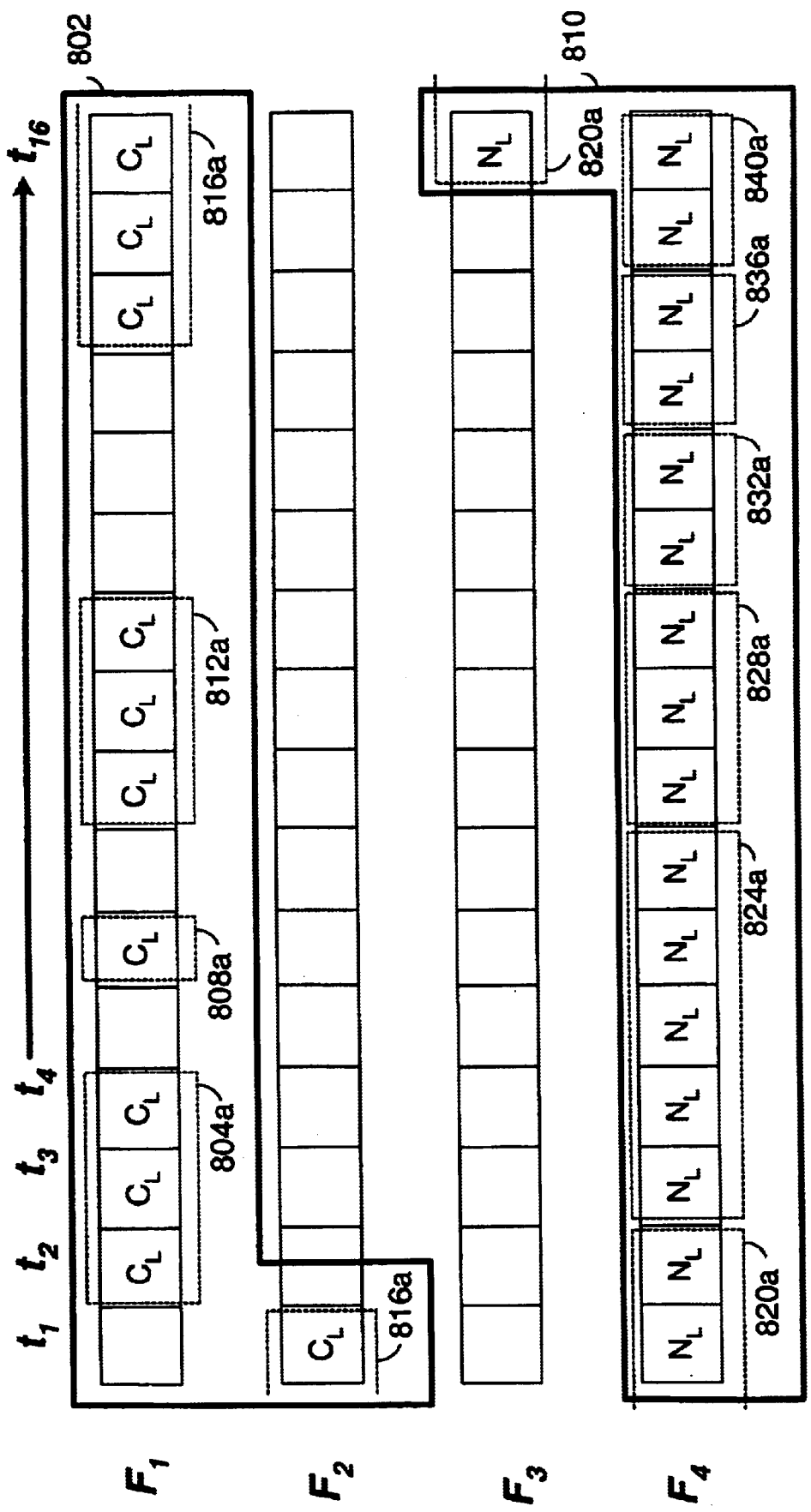

FIG. 8B represents the results of step 508 and 510 for FIG. 5 (as well as steps 608 and 609a for FIG. 6). First (step 508 and 608) the legacy CBR connections are assigned the same communication channels in the new RAT as they were assigned in the prior RAT. The reason for assigning the same communication channels for ongoing CBR subscribers is to assure the Quality of Service (QoS) guaranteed to the CBR subscribers (i.e. to avoid problems with 'jitter'). As an example of this, subscriber 804a in the RAT (as illustrated in the old RAT in FIG. 8a) is assigned to time slots $t_2$, $t_3$, and $t_4$ of frequency range $F_1$. As demonstrated in FIG. 8B, subscriber 804a is still assigned to time Slot $t_2$, $t_3$, and $t_4$ of frequency range $F_1$ in the new RAT. The portion of the RAT that represents the ongoing CBR subscribers is labeled 'Range 802' and is shown generally at 802 in FIG. 8A.

Following the assigning of ongoing CBR subscribers, the ongoing Non-CBR subscribers are assigned to new communication channels (step 510 and 609a). All spaces between the legacy Non-CBR subscribers are removed, and these subscribers are assigned communication channels at the 'end' of the RAT. This is represented by 'Range 810' and is shown generally at 810 in FIG. 8B. The method of assigning new communication channels for ongoing Non-CBR subscribers creates the greatest possible range of available contiguous communication channels for the assigning of new Non-CBR connections. Since the Non-CBR subscribers are not guaranteed the QoS of the CBR subscribers, the ongoing Non-CBR subscribers are subject to reassignment at the discretion of the RM.

Figure 8C:
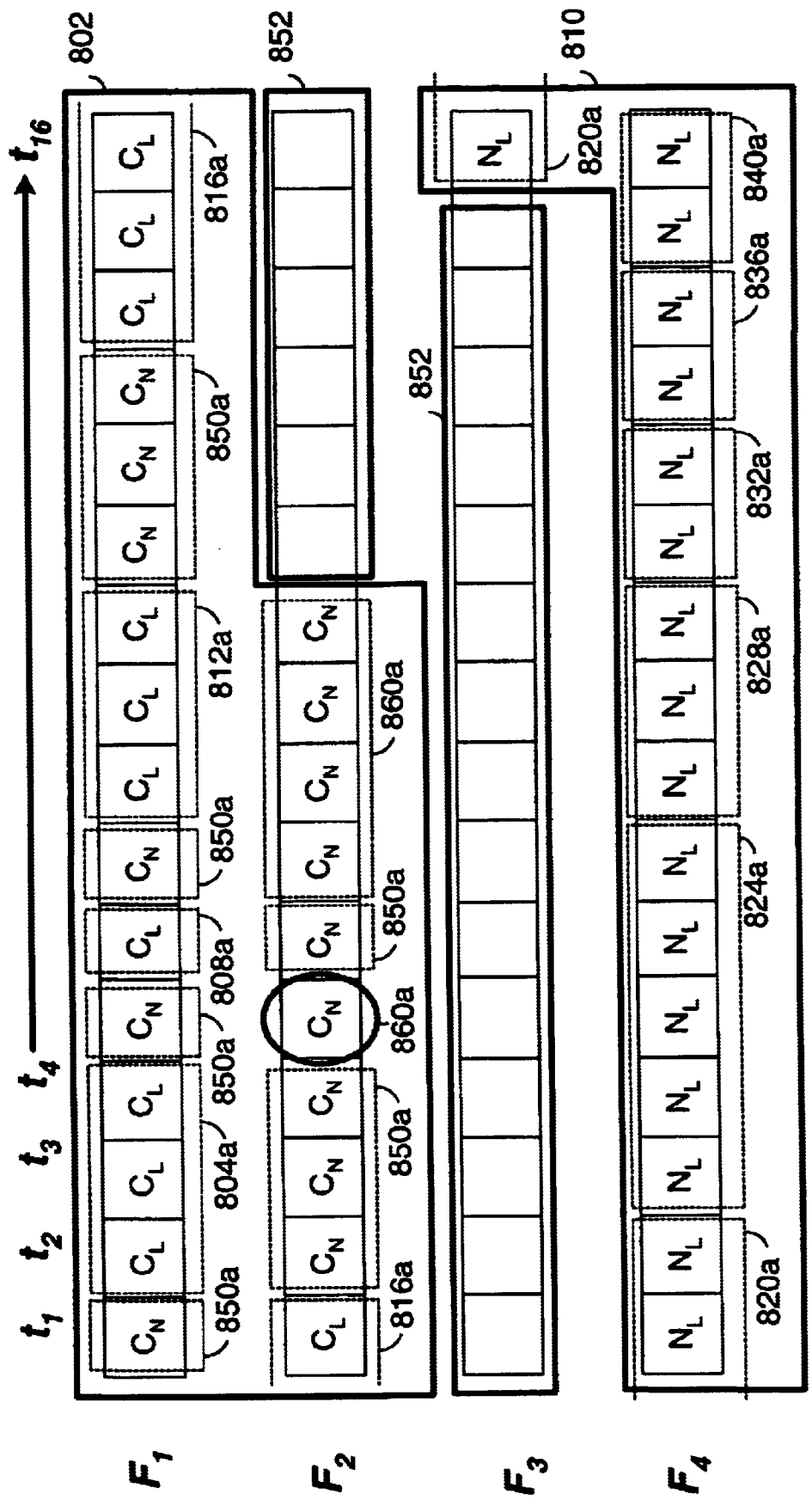

FIG. 8C represents the results of step 511 in FIG. 5 (as well as 609B for FIG. 6). This indicates that new CBR subscribers are always given priority over new Non-CBR subscribers. Note in this example that subscriber 850a is packed into available free communication channels within the range of the legacy CBR subscribers. There is every attempt to isolate all CBR subscribers (i.e. both ongoing CBR subscribers and new CBR subscribers) into a single compact section of the RAT. Subscriber 850a has requested 10 communication channels. If these were assigned to the first ten available slots in the RAT, the last slot assigned would have been time slot $t_5$ in frequency range $F_2$. It can be observed that this would violate the MFC since time slot $t_5$ was also assigned to subscriber 850a in frequency $F_1$. The encircled $C_N$, indicates that the tenth communication channel assigned to subscriber 850a is shifted to time slot $t_6$. Now the first slot assigned to subscriber 860a in time slot $t_5$ at frequency $F_2$ (the slot rejected by subscriber 850a). The completed assignment for subscriber 860a, extends the range of CBR defined communication channels.

FIG. 8C also identifies Range 852, which is the contiguous range of communication channel slots available for the assignment of new Non-CBR connections. In other words, Range 852 is defined as the set of communication channel slots following the last CBR communication channel and preceding the first ongoing Non-CBR communication channel. The last CBR communication channel represents either an ongoing CBR or new CBR subscriber, whichever occupies the communication channel furthest into the RAT. It should be noted that the steps represented by FIGS. 8A through 8C are the same for all embodiments of this invention. The invention now proceeds to optimally assign communication channels to the new Non-CBR subscribers.

The next step in the algorithm is to assign communication channels to the new Non-CBR subscriber (as depicted by step 512 in FIG. 5 and step 610 in FIG. 6). FIG. 9 further describes the information related to the new Non-CBR subscriber requests for the example above. The number of requested channels ("Communication Channels Requested") and the revenue value ("Request Revenue") are associated with each new Non-CBR subscription request. For example, subscriber 870a is requesting ten communication channels that represent 75 units of revenue to the network operator. The RM may then compute the Unit Revenue ("Revenue/Channel" in FIG. 9) to be 7.5, by dividing the units of revenue for the connection by the number of communication channels requested. This is done for each new Non-CBR subscriber request. An examination of the example demonstrated in FIG. 8C, shows that there are 21 RAT slots available for new Non-CBR subscribers (Range 852 in FIG. 8C), which is exceeded by the total number of Non-CBR channel requests.

In the first embodiment of the invention, the objective of the RM is to select the largest possible number of new Non-CBR subscribers within the 21-slot limit from among the eight new Non-CBR candidate subscribers (step 512). FIG. 10 is a table representing the analysis performed by the RM to determine the optimal allocation policy for the first embodiment of the invention. Data from FIG. 9 has been sorted in increasing order of Communication Channels Requested. As such, request 880a of FIG. 9, which represents a request for two communication channels, has the highest priority since it represents a subscriber requesting the fewest number of communication channels as shown in FIG. 10. Beginning with subscriber 880a, the RM assigns communication channels to as many requests as possible in the order displayed in FIG. 10, subject to the limit of 21 available communication channels allotted to new Non-CBR subscribers. The column with heading "Number of Channels Assigned", counts the channels as they are assigned. When this is a number less than or equal to 21, and adding the "Communication Channels Requested" to the current total exceeds 21, no more assignments can be made. The column with heading "Request Accepted" indicates which requests are approved. In this case the accepted subscribers represented communication channels totaling exactly 21, and the remainder of the new Non-CBR candidates are rejected. This table indicates that 5 new Non-CBR connections are made (880a, 872a, 878a, 882a, and 884a) when the policy is to maximize the number of connections.

The right most column in FIG. 10 ("Revenue Realized") is for reference only and indicates that the total revenue realized from the five new Non-CBR subscribers is 97 units. This value will be referred to later when comparing the results achieved here with the results achieved with another embodiment of the invention.

Figure 11:
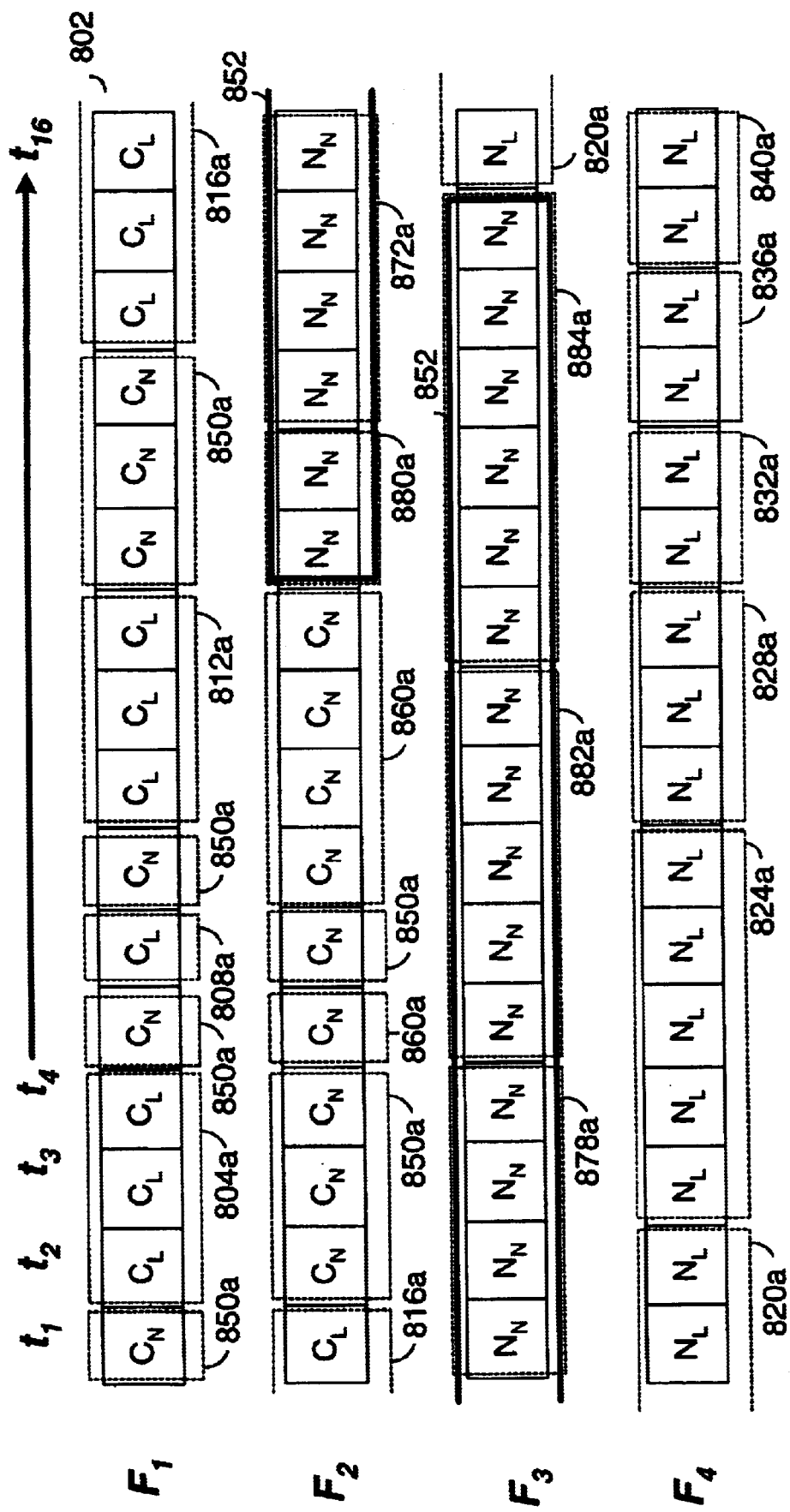
FIG. 11 is a functional block diagram illustrating resource allocation according to a first preferred embodiment of the invention.

FIG. 11 is a functional block diagram illustrating resource allocation according to the first preferred embodiment of the invention. In Range 852 indicated by the 10 bold lines, subscriber 880a, which had the highest priority, is assigned to the first two slots beyond the CBR connections. This is followed by subscriber 872a, which completes the assignment to time slots for frequency $F_2$. Subscribers 878a, 882a, and 884a are then assigned in contiguous slots in frequency $F_3$, to complete the assignment of subscribers in the available range represented by Range 852.

Upon completion of the optimal assignment of resources to the RAT, the RM transmits the resource allocation assignments to the subscribers (step 514). The lower priority subscribers are then notified of the rejection of their requests (step 516), and this embodiment of the algorithm is complete.

In the second embodiment of the invention, the RM must select the set of new Non-CBR candidates that result in the order of unit revenue opportunity subject to the 21-slot limit (step 610). FIG. 12 is a table representing the analysis done by the RM to determine the optimal allocation policy for the second embodiment of the invention. Data from FIG. 9 has been sorted in decreasing order of revenue per channel ("Revenue/Channel"). As such, request 870a, which represents 7.5 units of revenue per channel requested, has the highest priority.

Beginning with subscriber 870a, the RM assigns communication channels to each candidate subscriber in the order displayed in FIG. 12, so long as the cumulative total number of assigned communication channels to new Non-CBR candidates does not exceed the limit of 21 communication channels available to new Non-CBR subscribers. In FIG. 12, the assignment of subscriber 870a (requesting 10 communication channels) and subscriber 884a (requesting 6 communication channels) results in the assignment of 16 out of the available 21 channels.

The subscriber with the next highest priority is 874a requesting 8 channels. However subscriber 874a must be rejected because the 8 channels added to the prior 16 channels violates the limit on the number of communication channels available for new Non-CBR subscribers. The algorithm then considers each of the other subscribers in order of priority represented in FIG. 12. If the cumulative assignment of new Non-CBR assigned communication channels plus the resources requested by the next candidate subscriber exceeds the limit of 21 channels, the candidate is rejected. Otherwise, the candidate is accepted and the number of new Non-CBR assigned communication channels is updated to include the communication channels assigned to the new subscriber.

Applying this logic, subscriber 880a is accepted since the request for two communication channels added to the cumulative total of 16 channels does not exceed 21. After accepting subscriber 880a, a total of 18 (of the 21 available) communication channels has been assigned. FIG. 12 demonstrates that all subscribers with lower priority than subscriber 880*a* are requesting more than the 3 remaining available communication channels. Therefore, no more allocations can be made. The optimal assignment then selected subscribers 870*a*, 884*a*, and 880*a* as indicated in the "Request Accepted" column. The revenue returned for the 5 subscribers selected totals to 127 units.

Figure 13:
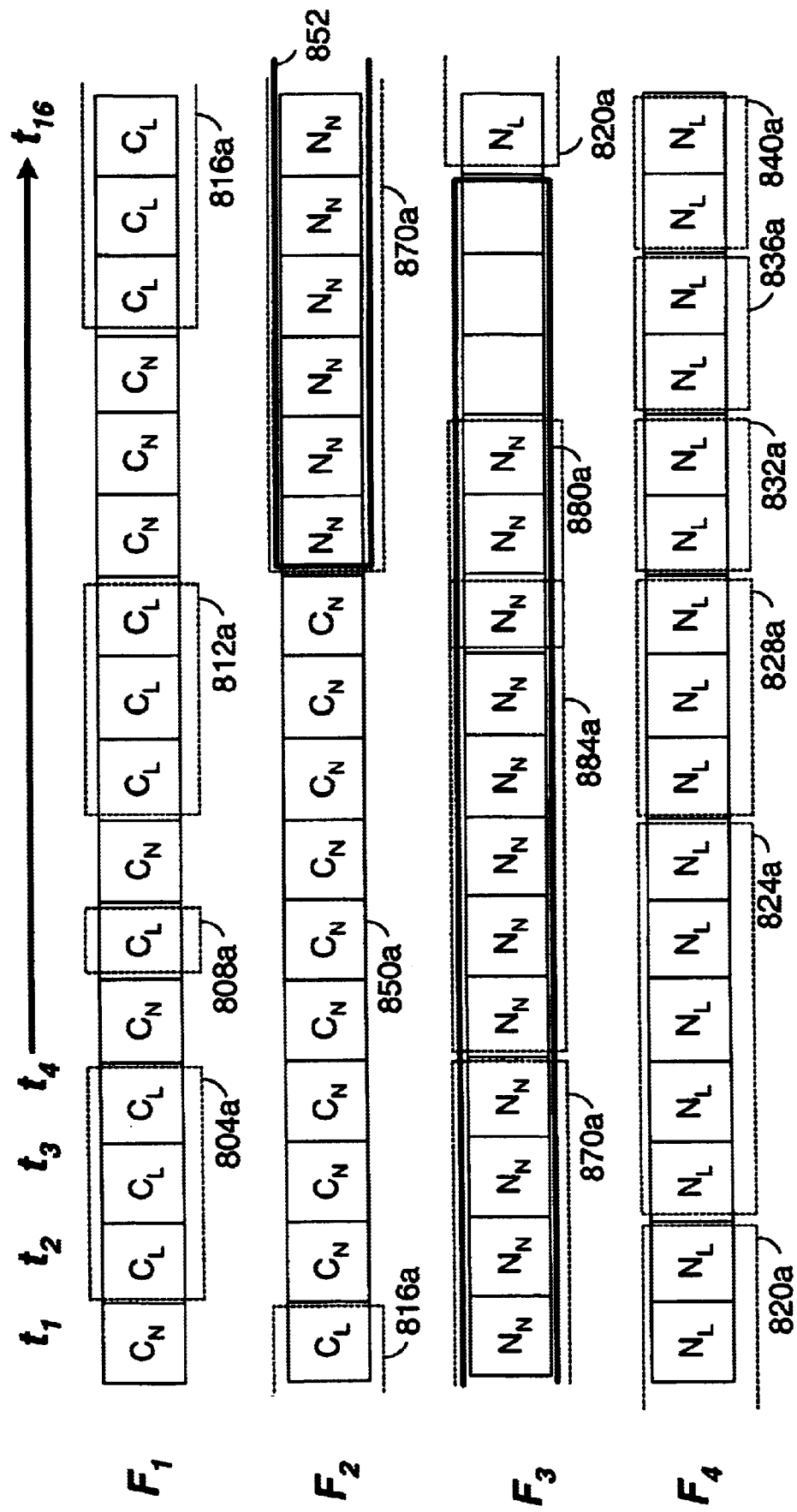
FIG. 13 is a functional block diagram illustrating resource allocation according to the second preferred embodiment of the invention.

FIG. 13 is a functional block diagram illustrating resource allocation according to the second preferred embodiment of the invention. In Range 852 indicated by the bold lines, subscriber 870*a*, which had the highest priority, is assigned to the last six slots of frequency $F_2$ plus the first four slots of frequency $F_3$. This is followed in frequency F3 by the six communication channels requested by subscriber 884*a*, then the two communication channels requested by subscriber 880*a*. Since no more subscribers can fit into the remaining available communication channel slots, three slots will go unused, although there are subscribers who will be rejected. This completes the assignment of new Non-CBR subscribers in the available range represented by Range 852. It is acknowledged that some other combination of new Non-CBR subscribers could improve the solution represented above. However the improvement could only be discovered through exhaustive evaluation of alternatives (i.e. determining the absolute optimal solution for the computationally complex Knapsack Problem, which can not be done in real time).

With the determination of the near optimal assignment of resources to the RAT, the RM transmits the resource allocation assignments to the subscribers (step 612). The lower priority subscribers are then notified of the rejection of their requests (step 614), and this embodiment of the algorithm is complete.

As a point of comparison, contrast the result of FIG. 11 with that of FIG. 13. In the earlier example, the objective was to maximize the number of connections. In which case, there were 5 connections made that resulted in only 97 units of revenue. In the example demonstrated by FIG. 13, the objective was to maximize the revenue realized from the connections made. In which case, the total revenue produced was 127 units, but there were only 3 connections made. These are the results expected based on the respective objectives.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. An apparatus for allocating communication channels in a wireless communication network, comprising:
   a memory for storing computer instructions for generating and transmitting allocation assignments wherein the computer instructions also include logic for building a queue of communication channel resource requests received during a specified time period; and
   a processor coupled to communicate with the memory to generate the allocation assignments according to the logic defined by the computer instructions and coupled to transmit the allocation assignments after the specified time period has elapsed, wherein the computer instructions prompt the processor to rank the resource requests according to size wherein the smaller the size the higher priority ranking.

2. The apparatus of claim 1 wherein the computer instructions include logic for ranking communication channel resource requests and for allocating communication channels according to rank.

3. The apparatus of claim 1 wherein the computer instructions rank the resource requests according to whether the request is for carrying continuous bit rate (CBR) service communication signals.

4. The apparatus of claim 1 wherein the computer instructions prompt the processor to rank the resource requests according to revenue value of the requests.

5. A data frame having communication channel allocation assignments, comprising:
   a first section of allocated communication channels for carrying continuous bit rate service communication signals;
   a second section of allocated communication channels compacted and relocated to the end of the allocation table for carrying on-going non-CBR communications; and
   a third section of allocated communication channels formed between the first and second sections for carrying communications for newly received non-CBR resource requests.

6. The data frame of claim 5 wherein the allocated communication channels in the third section are ranked according to revenue value.

7. The data frame of claim 5 wherein the allocated communication channels in the third section are ranked according to size.

8. The data frame of claim 7 wherein the smaller resource request size the higher the priority.

9. The data frame of claim 5 wherein the communication channels in the third section are arranged according to value in decreasing order.

10. The data frame of claim 9 wherein the value is a unit value that is calculated by dividing the value of a particular area by the number of requested channels.

11. A method in a wireless network resource manager for allocating communication channel resources, comprising:
    receiving resource requests from a plurality of wireless subscriber units;
    waiting for a specified period to expired prior to allocating communication channel resources responsive to the resource requests;
    forming a queue of resource requests as the resource requests are received while waiting for the specified period to expire; and
    allocating communication channels according to rank, including allocating communication channels to new non-CBR subscribers by evaluating at least one factor, the at least one factor comprising a size of a corresponding resource request.

12. The method of claim 11 wherein the allocating step comprises allocating communication channels to legacy continuous bit rate subscribers prior to any other subscribers.

13. The method of claim 11 wherein the allocating step comprises compacting legacy non-CBR subscribers and assigning them to communication channels at the end of the resource allocation table (RAT).

14. The method of claim 11 wherein the new CBR connection requests are assigned to available communication channels close to the legacy CBR connections.

15. The method of claim 11 wherein the at least one factor also includes a unit revenue for the resource request.

16. The method of claim 11 wherein the allocating step comprises allocating communication channels first to legacy continuous bit rate subscribers, then to legacy non-CBR subscribers, and then to the new CBR subscribers, then to the new non-CBR subscribers.

17. The method of claim 11 wherein the allocating step comprises allocating communication channels according to type wherein there are at least two different types.

18. The method of claim 17 wherein, if two subscribers requests communication channel resources of the same size, communication channels are allocated according to an order in which the resource requests were made.

19. The method of claim 17 wherein, if two subscribers request communication channel resources having the same unit revenues, communication channels are allocated to the subscriber requesting the smaller number of communication channels first.

20. The method of claim 11 wherein the resource manager comprises a network control center of a satellite based communication network.

21. The method of claim 11 wherein the resource manager comprises a mobile switching center or base station subsystem of a land based wireless communication network.

22. The method of claim 11 wherein the waiting step comprises waiting a period of time that is less than or equal to the period of a data frame having a plurality of communication channels.

23. The method of claim 11 wherein communication channels are allocated to carry subscriber communication signals in a frame grouped together.

24. The method of claim 11 wherein the allocating step further includes allocating communication channel resources to subscribers having legacy (on-going) connections.

25. The method of claim 24 wherein communication channel resources are allocated first to the subscribers having legacy connections and then the new subscribers.

26. A method in a wireless network resource manager for allocating communication channel resources, comprising:

waiting for a specified period prior while receiving resource requests; and allocating communication channel resources responsive to the resource requests according, at least in part, to the size of the requested resource, wherein the communication channels are allocated in order of increasing size wherein the smallest size is given the highest priority and first allocation.

27. The method of claim 26 wherein the communication channels are allocated in order of decreasing order of unit revenue wherein the largest unit revenue request that may be accommodated is given the highest priority and first allocation.

* * * * *